July 24, 1956   P. O. PFEIFFER ET AL   2,756,048
PNEUMATIC SUSPENSION SYSTEM FOR VEHICLES
Filed July 30, 1952   8 Sheets-Sheet 2
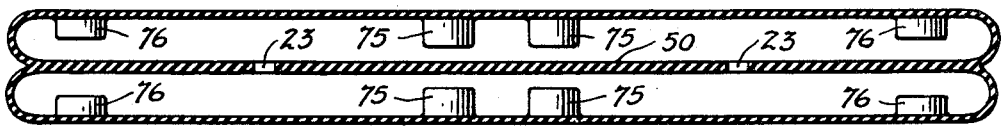
Fig. 3
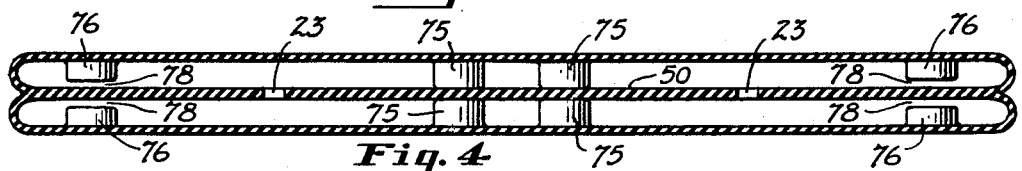
Fig. 4
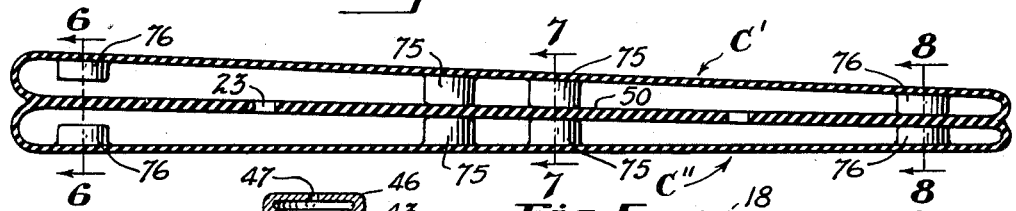
Fig. 5
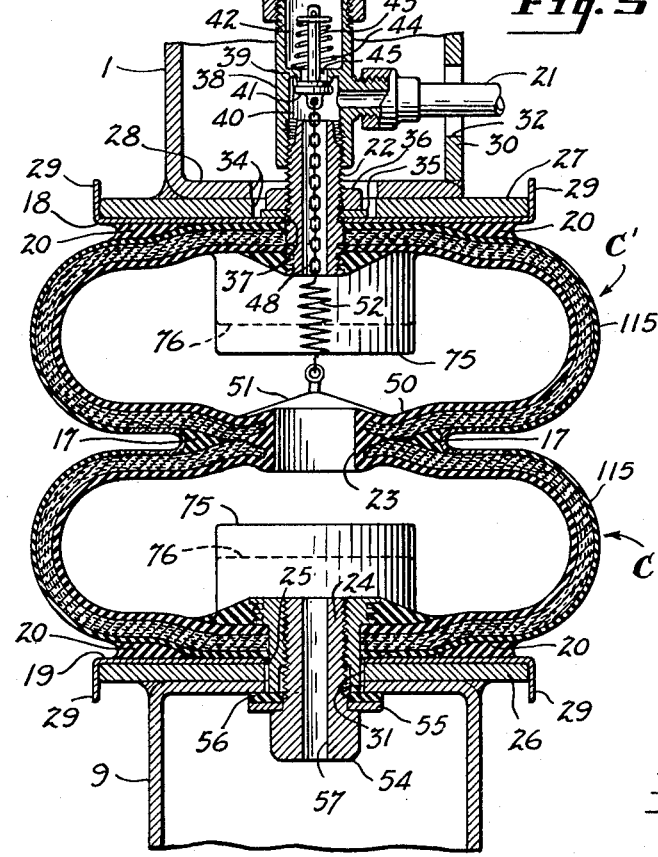
Fig. 9
Fig. 6
Fig. 7
Fig. 8
INVENTORS
PAUL O. PFEIFFER
CHARLES O. SLEMMONS
JULIUS R. KING
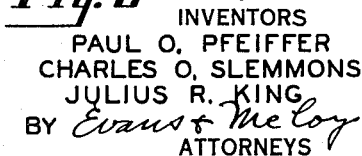
ATTORNEYS

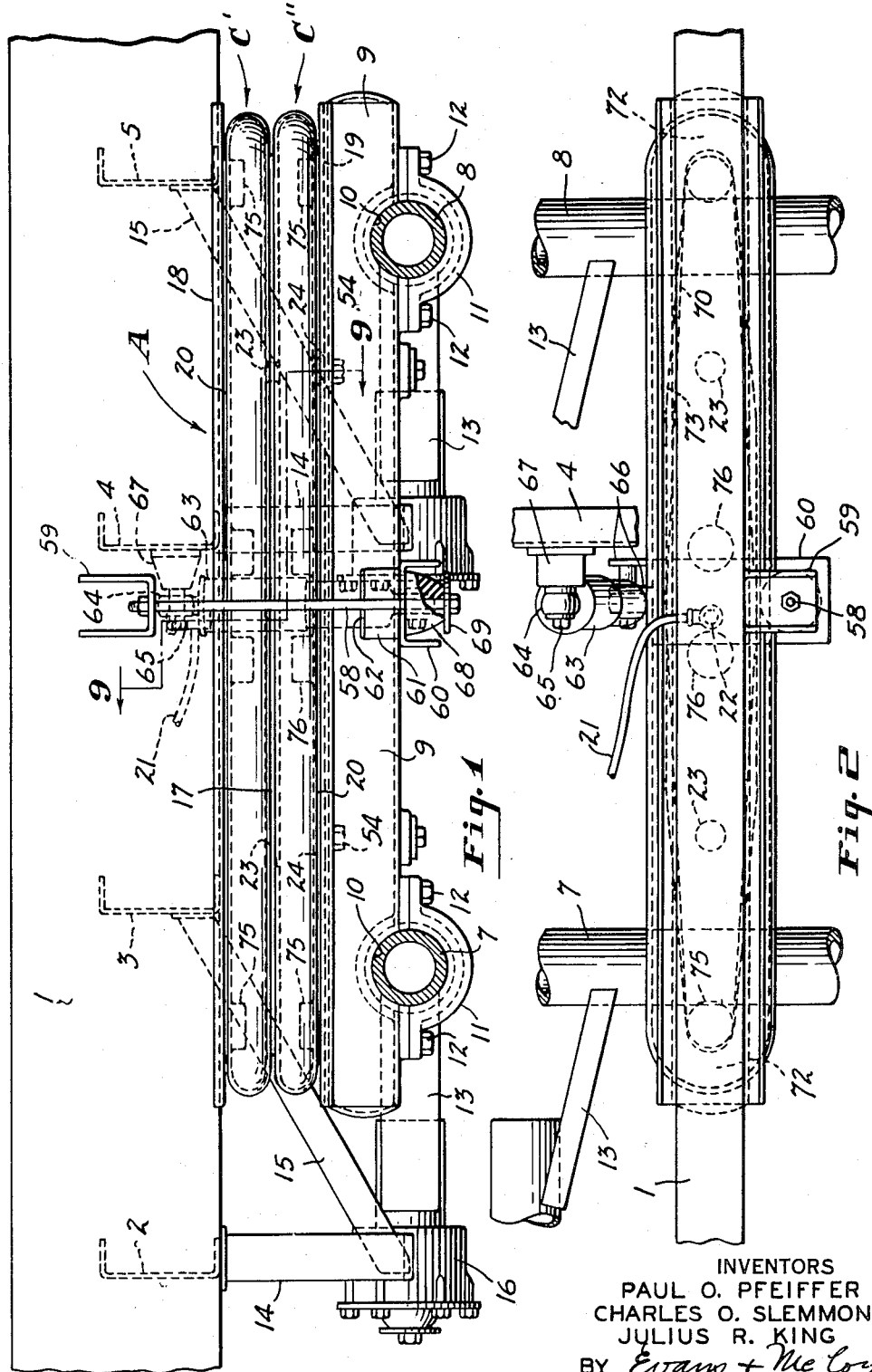

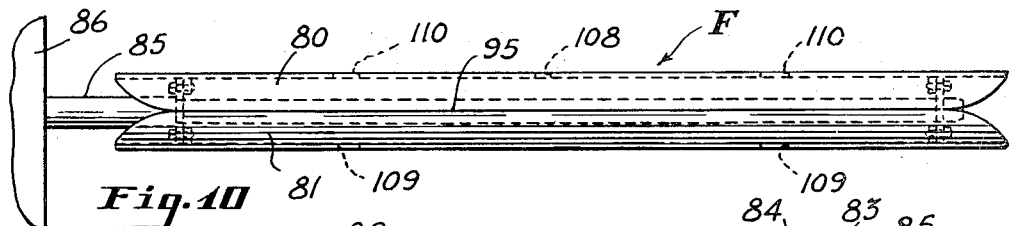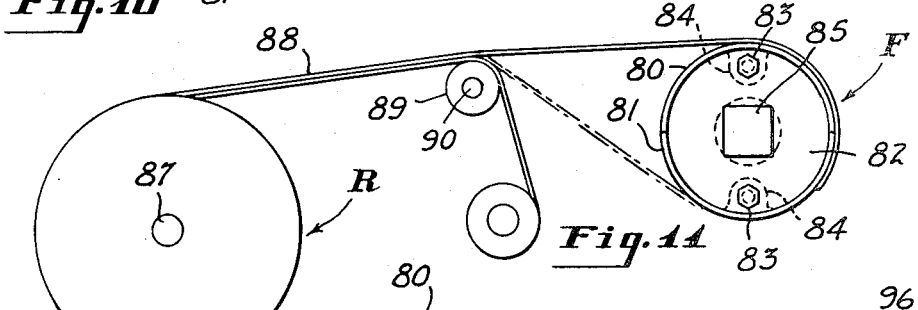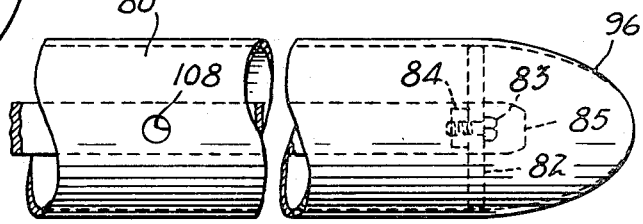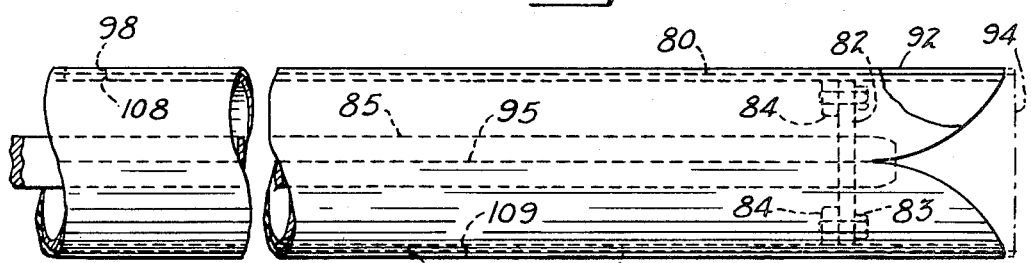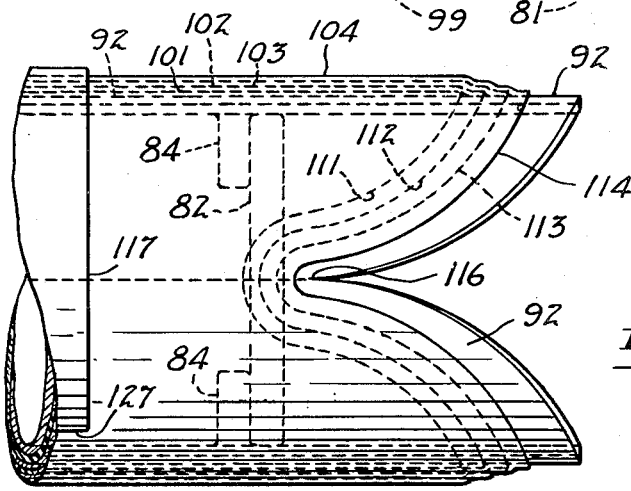

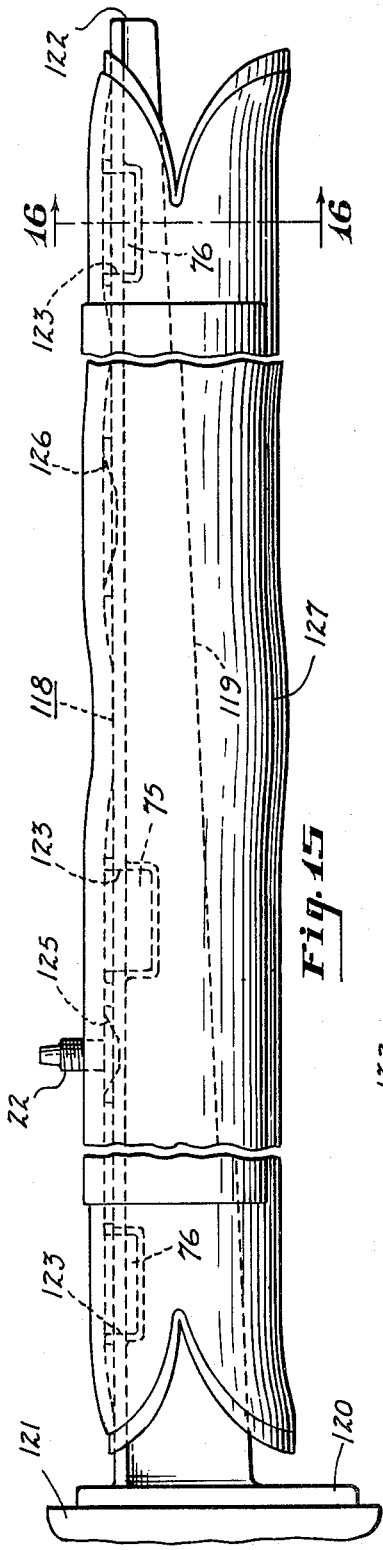
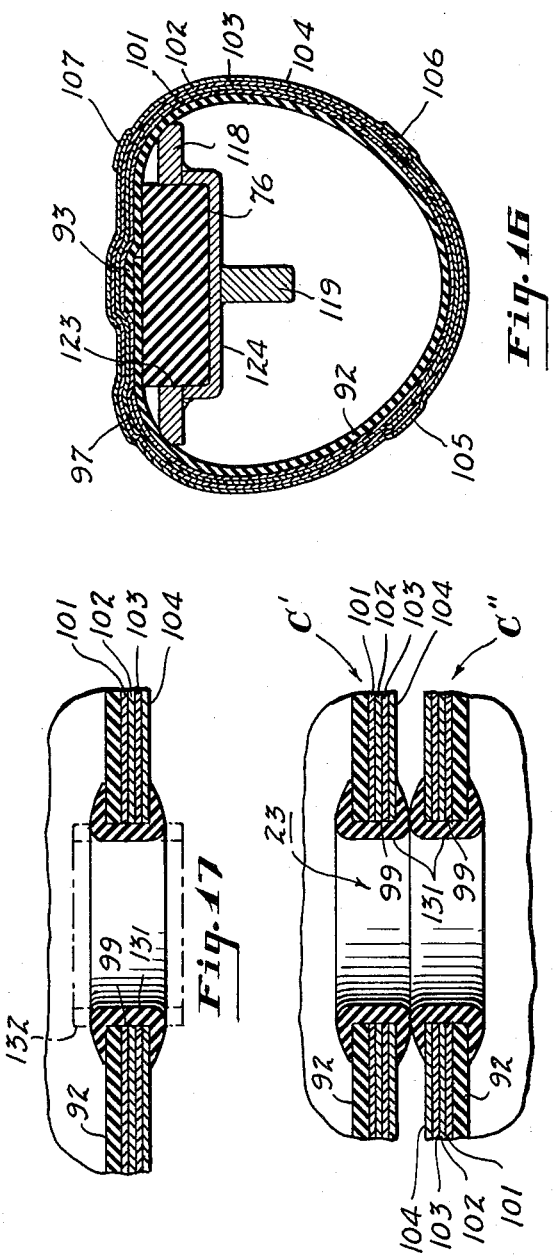
INVENTORS
PAUL O. PFEIFFER
CHARLES O. SLEMMONS
JULIUS R. KING
BY Evans + McCoy
ATTORNEYS July 24, 1956  P. O. PFEIFFER ET AL  2,756,048
PNEUMATIC SUSPENSION SYSTEM FOR VEHICLES
Filed July 30, 1952  8 Sheets-Sheet 5
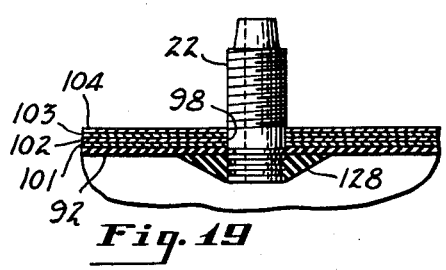
Fig. 19
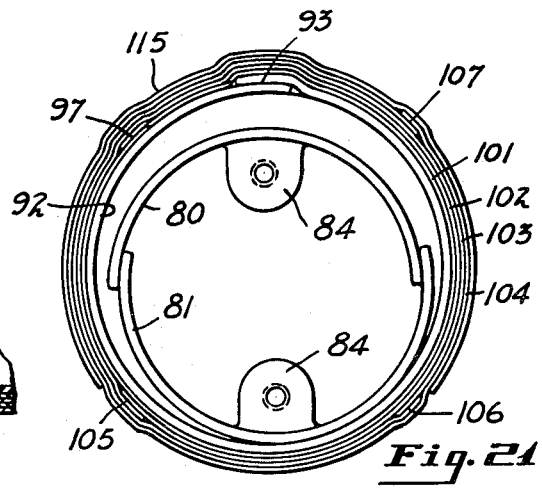
Fig. 21
Fig. 20
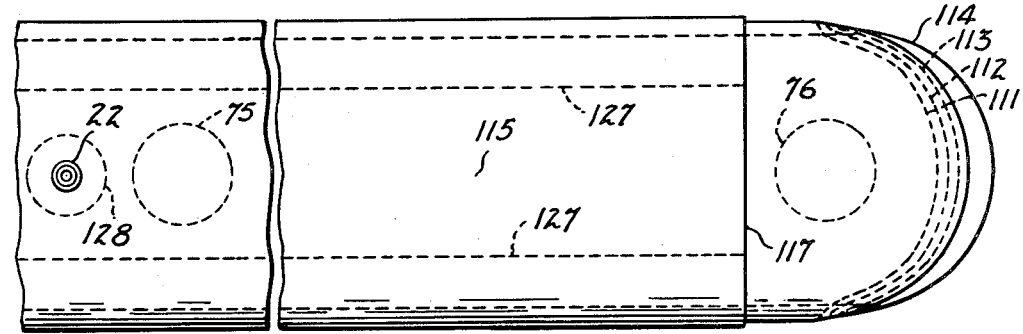
Fig. 22
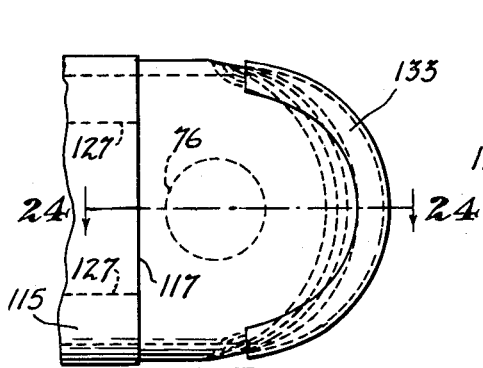
Fig. 23
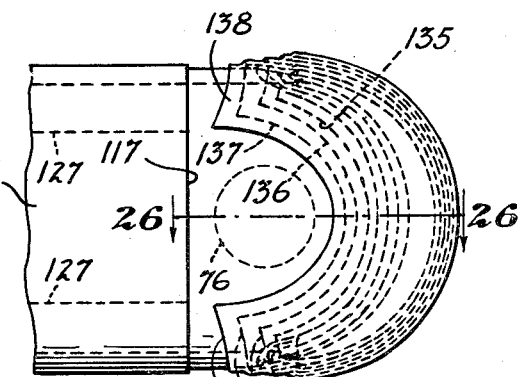
Fig. 25
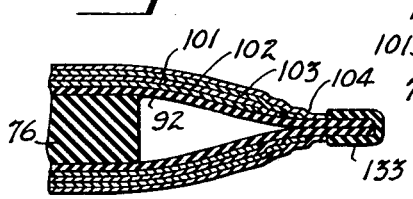
Fig. 24
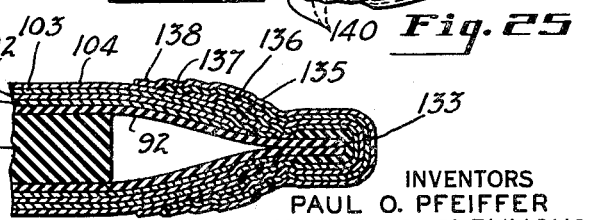
Fig. 26
INVENTORS
PAUL O. PFEIFFER
CHARLES O. SLEMMONS
JULIUS R. KING
BY Evans & McCoy
ATTORNEYS July 24, 1956   P. O. PFEIFFER ET AL   2,756,048
PNEUMATIC SUSPENSION SYSTEM FOR VEHICLES
Filed July 30, 1952   8 Sheets-Sheet 6
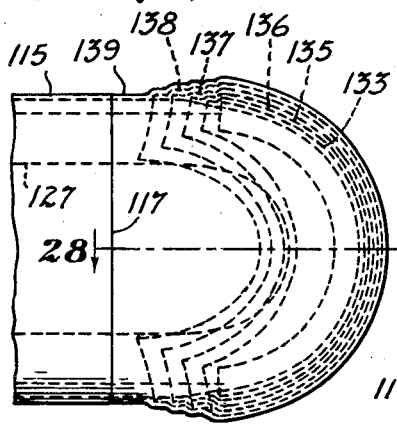
Fig. 27
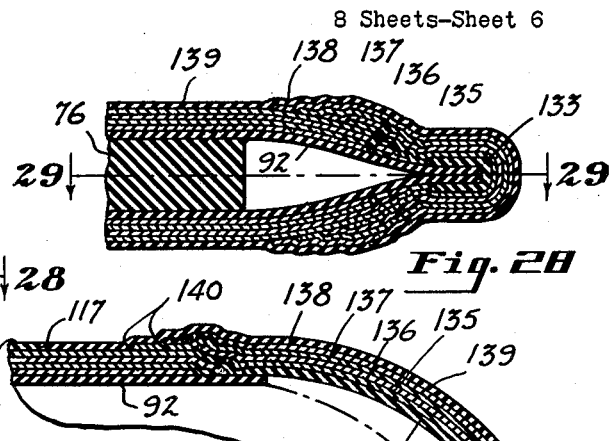
Fig. 28
Fig. 29
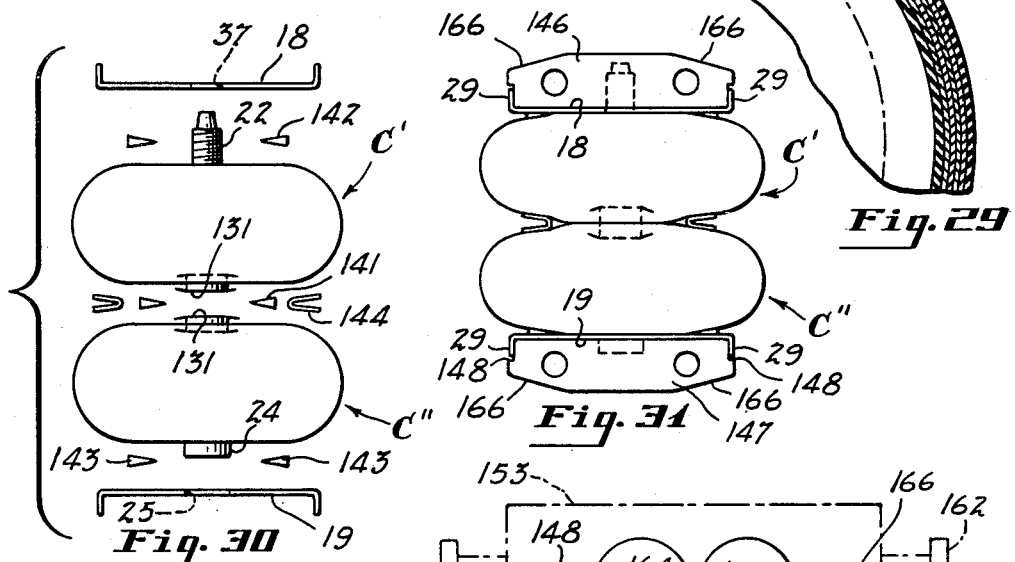
Fig. 30
Fig. 31
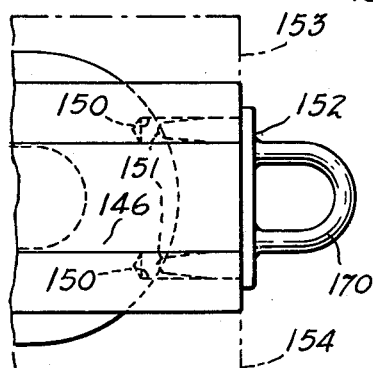
Fig. 33
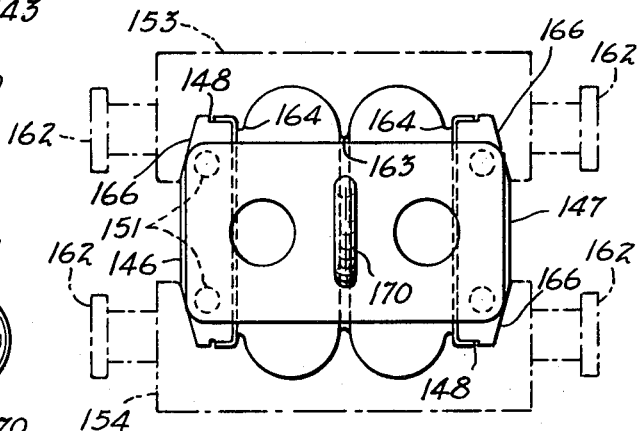
Fig. 32
INVENTORS
PAUL O. PFEIFFER
CHARLES O. SLEMMONS
JULIUS R. KING
BY Evans + McCoy
ATTORNEYS

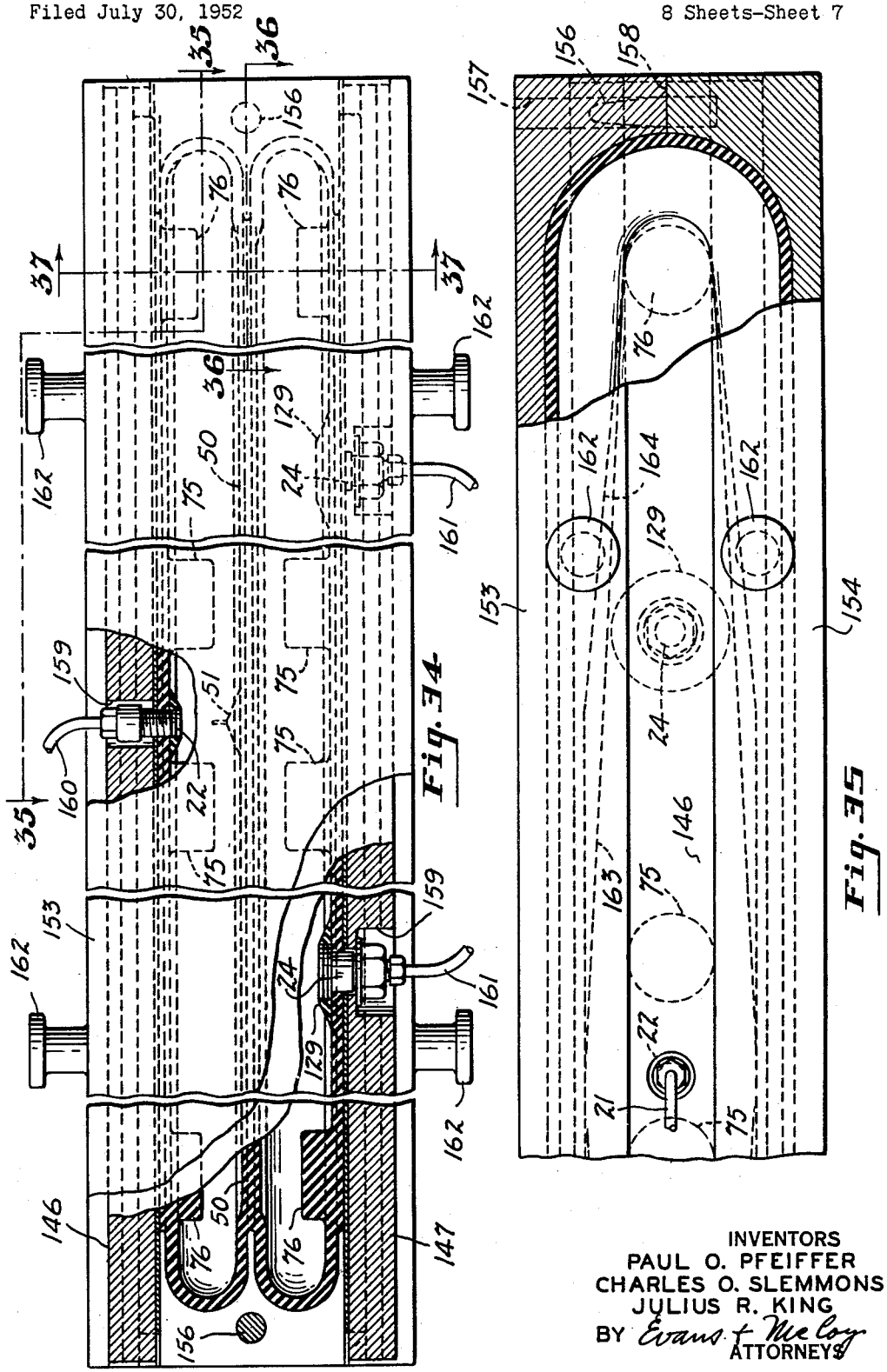

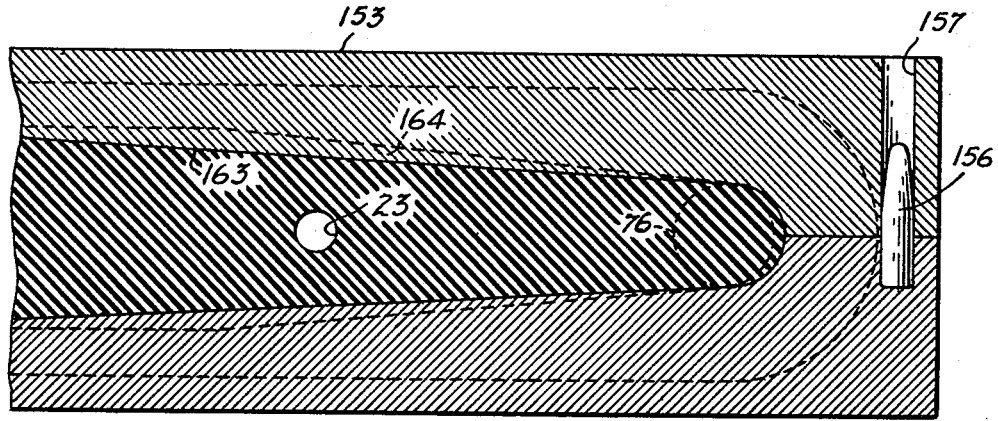
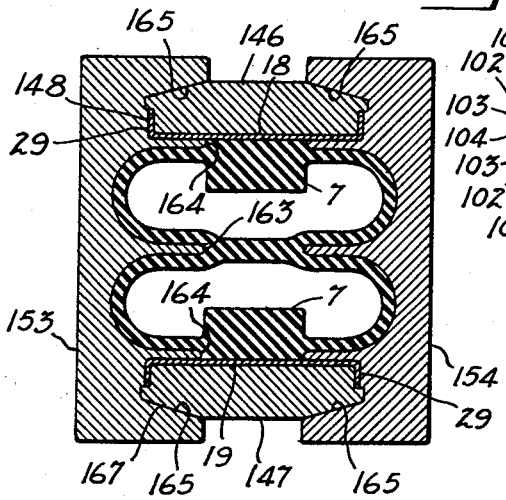
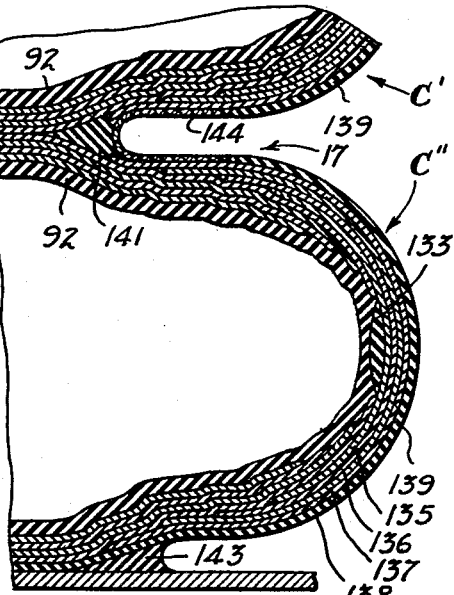
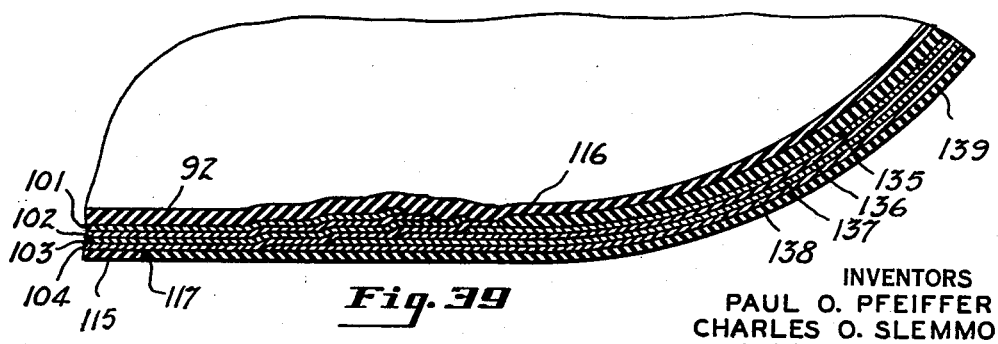

United States Patent Office
2,756,048
Patented July 24, 1956

2,756,048

PNEUMATIC SUSPENSION SYSTEM FOR VEHICLES

Paul O. Pfeiffer, Charles O. Slemmons, and Julius R. King, Akron, Ohio, assignors to The General Tire and Rubber Company, Akron, Ohio, a corporation of Ohio Application July 30, 1952, Serial No. 301,735

16 Claims. (Cl. 267—65)

This invention relates to pneumatic suspension systems for vehicles, more particularly to systems of the walking beam type in which an elongated inflatable cushion is interposed between the vehicle frame and a walking beam that rests on the axle or axles on which the vehicle wheels are mounted. The invention is concerned with the physical structure of an elongated deformable pneumatic cushion and certain refinements in the suspension system to obtain a simpler and more durable apparatus and one which can be made, installed and serviced at minimum expense.

Air cushions for vehicles are well known, and the advantages of a suspension system employing air or other gas as a yielding supporting medium have been recognized heretofore. There has been considerable difficulty, however, in providing pneumatic suspension systems for vehicles because of the complexity of such devices, their cost and the lack of reliability resulting from service failures of the deformable cushion components. While substantial improvements have been achieved in connection with pneumatic suspension systems having deformable cushions that are symmetric about their working axes, that is, of circular section, there are a number of recognized deficiencies in cushions of the horizontally elongated or extended type. It is therefore the general aim of the present invention to overcome deficiencies of prior cushions of the elongated type and to provide a generally improved long-lived cushion having desirable operating characteristics.

Earlier cushions of the type that are nonsymmetrical about their working axes, particularly cushions of the elongated type, usually have walls of non-uniform thickness that result in stress concentrations and ultimate wall failures or ruptures. In the cushion of the present invention a pair of cells, each of flattened cross-section and of substantially uniform wall thickness throughout, are superimposed one on another. At their ends the individual cells of the cushion assembly have closure structures that avoid objectionable irregularities in cell wall thickness, the joints between the end closures and the side walls of the cells comprising multiple sheet material layers having staggered edges and the joints extending in substantially semi-circular curves around the cell ends.

Another objective of the present invention is to avoid or overcome the rolling or lateral movement of pneumatic cushions and thereby obtain greater stability and load-carrying capacity. In the cushion of the present invention, comprising a plurality of superposed cells, the cells are integrally bonded together over a zone or zones extending longitudinally of the cushion cells and tapered in width. The tapering of the bonding area between the cushions permits non-uniform deformation of the cushion assembly, such as occurs in a rocking type suspension system, while yet resisting lateral rolling of one cushion on another. As a further refinement the top and bottom cushion cells are bonded to metal parts of the suspension system over elongated areas or cones that also taper in width to permit longitudinal rocking or unequal compression of one portion of the cushion with respect to another while resisting excessive lateral rolling of the cells.

Another object of the invention is to provide an elongated cushion assembly suitable for use in a rocking type suspension system, which cushion incorporates internal separators or blocks for limiting the compression by means of an internal support. To permit longitudinal rocking of the cushion assembly, such as occurs when the cushion is interposed between a frame member of a vehicle and a walking beam of a dual axle suspension system, the internal supporting means is tapered in height along the length of the cushion so that under load the internal support becomes effective at or adjacent the fulcrum point before it is effective at points remote from the fulcrum. In this manner rocking or pivoting of the walking beam or other equivalent member of a suspension system is permitted to a limited extent even when the internal supporting means is effective in carrying a portion of the load imposed on the cushion. A suitable arrangement for obtaining this tapered type of internal support is a series of blocks of rubber or the like secured in predetermined longitudinally spaced relation through the inside of each cell of the cushion assembly. The spacing is the same in each of the several cells of the cushion assembly, so that at several points along the length of the cushion assembly the blocks are in vertical alignment in bearing relation to one another to provide internal columns. In accordance with the tapered height principle referred to, the blocks remote from the fulcrum point are of less height than the blocks at or adjacent the fulcrum, so that the internal block column becomes effective at or adjacent the fulcrum of the cushion before the columns remote from the fulcrum become effective. A further advantage is obtained from the use of internal supporting means in the cushions, in that the common dividing wall or walls separating adjacent cushions are gripped between the internal blocks or other supporting means when the cushion is under severe load, this gripping of the partition or partitions having the effect of resisting lateral rolling movement of the cushion and thereby increasing the stability of the cushion under load.

Other objects and advantages pertain to certain novel features of construction and combinations and arrangements of parts, all of which are set forth and explained in the accompanying description of the invention. This description is made in connection with the accompanying drawings, which form a part of the specification. In the drawings:

Figure 1 is a fragmentary side elevational view of a dual axle suspension embodying and made in accordance with the principles of the present invention, the system being shown in connection with part of the frame of a highway trailer, the wheels and tires being removed from the axles;

Fig. 2 is a fragmentary plan view of a portion of the suspension system of Fig. 1 showing one of the elongated cushions;

Figs. 3–5 are diagrammatic view representing longitudinal sections through the cushions to show the location and action of the spacer or bumper blocks;

Figs. 6 through 8 are diagrammatic views representing transverse sections through the cushions under different working conditions, these views representing the conditions along the lines indicated respectively at 6—6, 7—7 and 8—8 of Fig. 5;

Fig. 9 is a transverse sectional view through one of the cushions, this view being taken substantially along the line indicated at 9—9 of Fig. 1 and showing the safety air release;

Fig. 10 is an elevational view diagrammatic in character showing a rotatable and collapsible building form or mandrel suitable for use in making the cushion cells of the present invention;

Fig. 11 is a diagrammatic end elevational view of the building form or mandrel of Fig. 10 together with a supply roll of the sheet material used in building the cushions, and a guide roll, this view being enlarged with respect to Fig. 10;

Fig. 12 is a fragmentary foreshortened plan view showing one end of the building form or mandrel of Fig. 11;

Fig. 13 is a foreshortened side elevational view at one end of the building form or mandrel, partly in section and with parts broken away and removed, this view showing in position on the mandrel a layer of raw or partly cured rubber sheet stock which forms the rubber lining of the cushion cell;

Fig. 14 is an elevational view of the right-hand end of the mandrel or form of Figs. 10 and 13, enlarged with respect to those figures, showing several layers of cord reinforced rubber sheet material wrapped about the form, the ends of the sheet material layers being contour trimmed in stepped or staggered relation;

Fig. 15 is a foreshortened side elevational view of a supplemental mandrel used in the cell building process of the present invention, this view showing a tubular open ended cell blank supported on the mandrel.

Fig. 16 is a transverse sectional detail taken substantially on the line indicated at 16—16 of Fig. 15 and enlarged with respect to that figure;

Fig. 17 is a fragmentary sectional detail through a portion of the wall on one of the cells showing the manner in which the aperture which forms the cell connecting passage is reinforced;

Fig. 18 is a fragmentary sectional detail showing the manner in which the apertures in the walls of the cells are placed in registry to form a connecting passage;

Fig. 19 is a fragmentary sectional detail through a portion of the top wall of the upper cell showing the air stem through which air is admitted to and released from the cushion;

Fig. 20 is a fragmentary sectional detail through a portion of the bottom wall of the lower cell showing the stem through which air flows between the flexible cushion and the air box or hollow beam;

Fig. 21 is an end elevational view of the building form or mandrel and an open ended tubular cell blank on the mandrel, this drawing being to the same scale as Fig. 14 and the mandrel being partially collapsed for axial withdrawal of the cell blank;

Fig. 22 is a foreshortened plan view showing one end of the open ended tubular cell blank in collapsed condition after removal from the supplemental assembly mandrel of Fig. 15 and before the end closure is made;

Figs. 23, 25 and 27 are diagrammatic plan views showing successive steps in the making of the end closure;

Figs. 24, 26 and 28 are sectional details of the end closure, diagrammatic in character, taken substantially along the lines indicated by the corresponding numerals in Figs. 23, 25 and 27;

Fig. 29 is a fragmentary sectional detail, diagrammatic in character, taken substantially along the line indicated at 29—29 of Fig. 28;

Fig. 30 is a diagram representing the relative position of the component parts comprising one of the cushions;

Fig. 31 is a diagram representing a transverse sectional view through a cushion assembled from the components shown in Fig. 30, the confining bars or rails of the mold being shown in position;

Fig. 32 is a partly diagrammatic end view of the cushion and the mold rails showing one of the fixtures for engaging the ends of the rails to locate the latter in predetermined spaced parallel relation, the mold halves being shown in broken outline;

Fig. 33 is a partly diagrammatic elevational view of one end of the structure shown in Fig. 32;

Fig. 34 is a foreshortened plan view, partly in section and with parts broken away and removed, showing a cushion in the curing mold;

Fig. 35 is a fragmentary elevational view, partly in section and with parts broken away, showing one side of the mold, this view being taken substantially along the line indicated at 35—35 of Fig. 34 to show one end of the cushion in section;

Fig. 36 is a partly diagrammatic fragmentary view representing a section taken longitudinally through one end of the mold to show the tapered zones of connection between the cushion cells and between the cells and the respective channel pans;

Fig. 37 is a partly diagrammatic transverse sectional detail through the mold showing the assembled cushion in curing position, this view being taken substantially along the line indicated at 37—37 of Fig. 34;

Fig. 38 is a diagrammatic sectional detail through the end of the cured cushion, this view being taken in a plane paralleling the longitudinal axis of the cushion to show the relative positions of the cord material layers or plies in the tubular cell body and in the end closure, this view corresponding to Fig. 28 of the illustrations showing the uncured or unmolded cell; and Fig. 39 is a diagrammatic horizontal sectional detail corresponding to Fig. 29 of the series showing the cushion cell prior to molding to show the side wall joint between the tubular cell body and the end closure upon completion of the molding operation.

*Suspension system*

The principles of the present invention are illustrated in a suspension system which is used, say, in a highway trailer. The body and frame structure of the trailer, as well as the wheels and tires, all of which are conventional, have been omitted from the drawings. One of the two spaced parallel main side frame members of the trailer or vehicle is indicated at 1 and several of the cross or connecting channel members that extend between the side members are shown at 2, 3, 4 and 5.

In accordance with the disclosure in United States patent application Serial No. 142,428, filed February 4, 1950, the suspension includes a pair of spaced, generally parallel cushion assemblies disposed one under each of the side beams of the trailer. To illustrate the present invention only one of the two cushion assemblies is shown at A, it being understood that a similar cushion assembly is located in companion relation between the far beam or side rail of the trailer and duel axles 7 and 8. These axles are in the form of cylindrical tubes and on their ends outside the cushion assemblies are mounted the customary wheels and tires, not shown.

Connecting the axles and serving as supporting beams for the deformable cells of the cushion assemblies A are hollow steel tanks or beams 9 which are airtight and are connected to the deformable cells of the cushions in the provision of auxiliary air chambers. Each of the tanks or hollow beams is transversely recessed or hollowed out on its underside to provide semi-circular sockets 10 that receive the axles 7 and 8, the axles being clamped in the sockets by semi-circular flanged retainers 11 removably secured to the underside of the tanks as by cap screws 12.

The axles 7 and 8 together with the two air boxes or beams that are secured to the axles adjacent the ends of the latter in spaced generally parallel relation thus constitute a rectangular frame structure for the running gear of the suspension system. Suitable bushings of rubber or the like are interposed between the axles and the sockets therefor in the beams or air boxes to permit twisting and warping of the running gear frame in use.

Each of the axles 7 and 8 is connected as by a forward extending yoke 13 to a depending member or post 14 located on the longitudinal centerline of the vehicle and secured to one of the frame cross members. The post for the yoke to the axle 7 is secured to the cross member 2 while the post for the yoke to the axle 8 depends from the cross member 4. Suitable diagonal bracing indicated at 15 is connected between the posts and the vehicle frame, the several parts being secured together as by welding. The connection between each yoke and its corresponding post comprises a flexible joint that permits limited relative movement and twisting of each axle. The flexible joints, briefly described but not forming part of the present invention, comprise hollow boxes 16 that contain and closely embrace ring shaped resilient cushions of rubber or the like, the rubber cushions being arranged in a suitable interlock between the box 16 and the end of the yoke 13 which is received in the box. The details of the joint are more fully disclosed in copending application for United States patent, Serial No. 338,189 filed February 24, 1953.

Cushion assembly

The cushion of each cushion assembly comprises a pair of elongated closed end tubular cells C' and C" that are secured together over a longitudinally extending zone indicated at 17 and to top and bottom channel pans 18 and 19 respectively over longitudinally extending zones 20. Air is supplied to each cushion from a suitable source under the control of automatic or manual valves through a flexible conduit 21 that is attached to a metal stem 22 secured to and projecting upwardly from the top wall of the upper cell C'. Communication between the cells is through openings 23 in the dividing wall or partition between the cells and located in the zone of connection 17. The bottom cell C" is connected to the tank member 9 for the interchange of air by means of threaded metal stems 24 secured to the bottom wall of the lower cell C". These threaded stems extend through openings 25 in the bottom pan 19, through openings 31 in the top wall of the beam 9 and a bearing plate 26 secured as by welding to the top of the beam. A similar bearing plate 27 is interposed between the trailer beam 1 and the top pan 18 of the cushion assembly, the plate being secured as by welding against the bottom face of the trailer side beam 1. The bearing plates 26 and 27 may extend laterally beyond the pressure face of the beam 9 and beyond the flange edges of the trailer beam 1 to increase the effective width of the beams. The channel pans 18 and 19 are of the same width and are formed along their opposite edges with longitudinally extending parallel flanges 29 that extend over the edges of the bearing plate 26 and 27 in embracing relation.

The bearing plates, thus confined between the flanges of the channel pans serve not only to provide support for the relatively thin sectioned, light weight channel pans over substantially the entire width of the latter but also to locate the channel pans in assembly so as to position the cushion structure in predetermined location between the trailer beam and the axle connecting air box or beam 9.

In fitting the suspension system of the present invention to existing trucks and trailers, frame beams of various designs and sizes will be encountered. The bearing plate 27 thus constitutes a convenient adapter. It cooperates with the bottom bearing plate 26 to give the desired lateral stability and wide bearing area; it is wider than the beams of truck and trailer frames ordinarily encountered in practice. By positioning the top bearing plate 27 in desired location and welding, bolting or otherwise securing it to the beam of the vehicle frame, a bearing area of the correct size and shape to receive and locate the top channel pan 18 is quickly and economically provided. In the case of a vehicle frame member or beam of channel shape it is desirable, as shown in Fig. 9, to reinforce the open channel side as by a welded plate 30, to the edges of the beam flanges. This reinforcing plate extends the full length of the cushion assembly and is formed with an opening such as indicated at 32 for the air conduit 21.

Openings 34 in the flange 28 of the vehicle beam and in the upper bearing plate 27 for the inflating stem 22 are larger than the corresponding aligned opening 37 in the channel pan 18 to accommodate a washer 35 and a nut 36 that grips the washer against the upper surface of the top pan. This mechanical interlock between the upper cell of the cushion and the channel pan 18 is provided principally to locate the parts in assembly and during the vulcanizing process but also augments the bond between the cell and the channel pan effected by vulcanizing.

Safety release

While it is feasible to connect the air supply conduit 21 directly to the inflation stem 22 of the cushion, it is desirable to interpose a safety release valve 38 which comprises a T fitting formed with a through passage aligned with the passage through the inflation stem 22 of the cushion. Internal threads on the T fitting are received on the threads of the inflation stem to hold the parts together and to provide the desired airtight seal. The interior of the T fitting is divided by a web 39 into a lower chamber 40 that accommodates a movable valve closure 41, and an upper chamber 42 that accommodates a stem 43 connected to the valve closure 41. A helical coil compression spring 44 biases the closure 41 normally to seal central opening 45 in the internal web 39. The spring seats at its lower end against the web and at its upper end against a washer held on the stem 43 as by a cotter pin at the upper end of the latter. The air supply conduit 21 is secured to a laterally projecting tubular branch of the T fitting, the branch opening into the lower chamber 40 of the valve body. A cap 46 is screwed onto the upper end of the T fitting of the valve and has an opening 47 to release to the atmosphere air that escapes from the cushion upon movement of the closure 41 away from sealing position across the opening 45. Control of the valve closure 41 is effected by a flexible chain 48 which extends downwardly through the chamber 40 in the T fitting, through the passage in the inflation stem 22, through the chamber in the upper cell C', and connects to web or partition 50 separating the cells. The connection of the chain to the cell partition is by means of a rubber patch 51 attached to the cell partition in assembly and vulcanized in place during the steam curing. The length of the connecting chain 48 is such that overinflation of the cushion, causing the cells to expand vertically, results in opening of the safety release valve to permit escape of air from the cells and thereby avoid rupture or other damage. A tension spring 52 is interposed in the chain connection of the valve closure 41 to the cell separating web 50, the spring 52 being stronger than the spring 44 to insure opening of the safety release valve. The spring 52 accommodates excessive distension of the cushion and prevents breaking of the connecting chain 48 and other parts of the safety valve from momentary or excessive expansion of the cushion cell such as might occur, for example, in travel of the vehicle over rough terrain causing relatively large amplitude movements of the suspension system components.

The threaded stem 24 secured in the bottom of the cushion is internally threaded to receive a tubular stud 54, the head of the latter acting against a metal washer 55 which compresses a rubber sealing washer 56 against the end of the stem 24 and also against the inside surface of the top wall of the hollow beam 9. The rubber washer 56 thus forms a seal about the openings 25 through which the stem 24 is received. A central passage 57 provides for a metered flow of air between the chamber in the bottom cell C" and the chamber in the hollow beam 9.

Rocker action tie

Expansion of the cushion assembly and movement of the hollow beam 9 away from the vehicle frame 1 is limited by a vertical tie 58 which may take the form of a high tensile heat treated steel rod connected between a bracket 59 secured to the outside face of the vehicle frame 1 and a stirrup member 60 which extends under and is secured to the hollow beam 9. The stirrup is a channel shaped member with its web disposed flatwise against the underside of the hollow beam. A pair of spaced upstanding flanges 61 are secured to the channel of the stirrup. These flanges are disposed one on each side of the beam member and are secured to the beam member along the neutral axis of the latter as by horizontal lines of welding 62. These horizontal welding lines constitute the only integral connection between the stirrup 60 and the heavy beam 9 and, being located on the neutral axis of the beam, are not subjected to the severe deformations and strains imposed on the top and bottom surfaces of the beam under load. The welding is thus confined to that portion of the beam carrying minimum tensile and compressive stresses to avoid working and other objectionable action at the joint and so that there is minimum deterioration of the crystal structure.

The end of the stirrup opposite that to which tie 58 is secured is connected to the cross member 4 of the trailer frame by a conventional hydraulic shock absorber 63. The ends of the shock absorber are formed with rings or eyes 64 received on studs 65 carried by projecting plate elements 66 on the stirrup and by bracket 67 secured to and projecting from the web portion of the trailer frame cross member.

In the normal use of the suspension system the cells C' and C'' of each of the two cushion assemblies are inflated through the supply conduits, one of which is indicated at 21, so as to maintain sufficient air pressure to support the load at substantially predetermined height above the axles. The pressure of air within the cells may thus vary with the load applied, it being desired to retain the ties 58 under sufficient tension to prevent complete slackening thereof in normal use. The particular type or types of air control valves employed may vary and are not part of the present invention. It is satisfactory, say, to employ height responsive valves that are opened and closed by the relative movement of the axles or beams 9 toward and away from the frame members 1 of the trailer. With the tie 58 thus maintained under continuous tension the desired "walking beam action" described in the first mentioned patent application is obtained. In this "walking beam" action the hollow beam 9 pivots or rocks on the lower end of the inextensible tie rod 58, the latter being held in tension by the internal air pressure maintained within the deformable cells. To accommodate this rocking action and avoid bending or other eccentric loading of the rod 58 the latter is received through a relatively large opening in the horizontal web portion of the stirrup 60 and is embraced by a tapered rubber compression member 68. The rubber member 68 is introduced between the bottom face of the stirrup 60 and a metal disc 69 retained on the lower end of the rod 58 by the enlarged or upset end of the latter. The upper end of the rod 58 is received through an aperture in bracket 59 and is threaded to receive a nut by means of which the effective length of the rod is adjusted. The rubber cushion member 68 has an external surface generated as by the rotation of a parabola about its major or principal axis which is also the axis of the rod 58. A central axial passage or opening in the rubber block receives the rod 58, the small or apex end of the cushion block being disposed downwardly against the flat disc 69 and the relatively broad circular base end of the cushion being directed upwardly and received flatwise against the underside of the stirrup 60. The depending flanges of the stirrup 60 thus protectively shield the rubber cushion block without restrictively confining the latter, and the clearances between the stirrup flanges and the disc 69 permit relative movement of the latter in the working of the connection during rocking of the hollow beam 9 on the tie rod 58. The tapered section of the rubber cushion also provides a compression characteristic whereby the resistance to compression increases at an increasing rate as the cushion is squeezed between the disc 69 and the bottom face of the stirrup.

*Cushion stabilization*

Multiple cell pneumatic cushions of the type comprising elongated tubular cells superimposed one on another are subject to lateral instability, particularly under heavy load. To resist lateral rolling of the cells of the cushion while maintaining and improving the rocker or walking beam action of the cushion assembly it has been found advantageous to bond or otherwise secure together the adjoining cells of the cushion assembly over an area or connecting zone having nonparallel edges. This feature is illustrated in Fig. 2 wherein the outline of the area or zone of bonding between the cells C' and C'' is indicated by broken lines 70. This bonding zone is widest at the center of the cushion adjacent the tie 58 and tapers toward both ends of the cushion. The bonding does not extend all the way to the cushion ends but terminates short of the ends to provide unbonded areas 72 at the cushion ends which permit free expansion of the cells in working and rocking under load.

The cells C' and C'' are bonded to the top and bottom channel pans 18 and 19 respectively over zones or areas each slightly larger than the bonding zone between the individual cells. In Fig. 2 the outline of the plan form of the bonding zones between the cells and the channel pans is indicated by the broken lines shown at 73. The bonding of the cells to the channel pans does not extend to the extreme ends of the cells, permitting free expansion and working of the cells.

*Internal spacing and emergency supporting blocks*

Spacing means comprising rubber blocks 75 and 76 are attached to any of the inside horizontal surfaces of the cushion cells. While attachment of the blocks to the common partition 50 is feasible, or the use of blocks some of which are attached to the common partition and some of which are attached to the top and bottom walls of the top and bottom cells is also feasible, it is preferred to attach the blocks, as shown, to the top and bottom walls respectively of the top and bottom cells, this arrangement facilitating assembly. The blocks 75 and 76 may be formed other than in the cylindrical shape show and may be elongated axially of the cushion into substantially continuous ribs extending substantially the full length of the cushion but tapered in height to give desired rocking action.

In the top cushion C' the rubber center cushions or spacers 75 and the end cushions or spacers 76 are all bonded to the top wall while in the bottom cell C'' the blocks are all bonded to the bottom wall. Corresponding blocks in the several superposed cells are disposed in alignment with one another so that the blocks are superposed and bear against one another when the cushion is compressed or collapsed. The action of the blocks is shown diagrammatically in Figs. 3 through 8. The cushion is shown under normal inflation in Fig. 3.

The central blocks or spacers 75 are of greater height or depth collectively than the end spacers 76 so that under heavy load or collapse of the cushion, shown in Fig. 4, the superposed center blocks bear against one another, the dividing wall or partition 50 being interposed. Thus the center blocks serve to support the load to which the suspension system is subjected should the cushions become deflated. End blocks 76, being of less height than the center blocks, normally do not come together in bearing relation when the cushion is deflated, the resulting clearance spaces, indicated at 78, permitting rocking action of the cushion assembly as shown in Fig. 5. In this rocking action the load continues to be carried primarily by the center blocks 75 which are superposed one above another to provide the desired support and to serve as a fulcrum for the rocking action. Although two pairs of center support blocks are shown, one superposed pair being located ahead of the tie 58 and another superposed pair being located behind the tie, it is possible to utilize only a single pair of superposed center cushion blocks or to use a greater number than indicated. To obtain the rocker or walking beam action, however, it is necessary that the support provided by the aligned block pairs be localized at or adjacent the tie 58, leaving the end portions of the cells relatively free for limited additional collapsing movement under severe rocking action. The end blocks 76 come into play to resist complete collapsing of the air cells and thereby prevent pinching or other damaging action. This coming together of the end blocks and the prevention of cell wall pinching is illustrated in Figs. 5 and 8 wherein the aligned end blocks are shown engaged in bearing relation against opposite sides of the cell partition 50.

In the normal condition the cells of the pneumatic cushion are inflated substantially to the shape indicated in Fig. 3 wherein all of the spacing blocks 75 and 76 are inactive or out of contact with the opposing or confronting walls of the cell. That is to say, the spacing blocks are in the nature of safety devices and come into play only under abnormal conditions such as collapse of the cushion under severe load or through loss of air or while working or rocking. When the cushion is collapsed or severely compressed as indicated in Figs. 4, 5, 7 and 8 the intermediate or common cell wall 50 is engaged or clamped between the blocks this clamping of the partition serving to prevent lateral shifting thereof to stabilize the cushion.

*Cell assembly*

Each of the cells C' and C'' is made up of a plurality of layers of bias cord reinforced rubber sheet material, an internal rubber liner and an external rubber cover, joined together in an integral unit by being vulcanized or cured in accordance with well-known practice in the rubber compounding and fabricating trade as modified by certain improvements described herein.

The cells are each assembled on a split mandrel or form F comprising semi-cylindrical matching halves 80 and 81. These form halves together define an elongated cylindrical tube, the halves being of uniform section, except at their contoured ends, and being secured to internal rings 82 by cap screws 83 that extend through apertures in the rings and are threaded into internal lugs 84 welded or otherwise attached to the inside surfaces of the form halves 80 and 81.

A square bar or shaft 85 supports the form F for rotation about a horizontal axis, the bar being cantilever mounted in a suitable supporting structure 86.

The cord reinforced rubber sheet material to be used in building the cushions may be supplied in a single continuous roll R that is mounted on a horizontal shaft 87 on which the roll turns as the rubber sheet material indicated at 88 is withdrawn for use. The shaft 87 is suitably mounted in general parallel relation to the shaft 85 which carries form F so that the rubber sheet material 88 may be drawn directly onto the form from the supply roll over suitable intermediate guide rolls, one of which is indicated at 89, the guide roll being carried by a supporting shaft 90 which also parallels the form shaft 85.

In assembling one of the cushion cells C' or C'' a layer of raw or partly cured gum rubber stock is first placed about the mandrel or form F to constitute lining 92 of the cell. This lining may be a sheet of gum rubber stock wrapped about the form with the sheet edges connected together in a lap joint 93, Figs. 16 and 21.

The contour of the form halves at each of their ends is such that the projection of their ends on parting plane 95 of the form halves is substantially parabolic (Fig. 12). Curved edges 96 of the contoured ends of the form halves are each tangent to the respective edges of the form halves and to the meeting plane 95, the curved edges each extending in a continuous curve from the meeting edge on one side of the form to the meeting edge on the other side of the form. The contour of the curved edges is a developed curve which provides on the end of the gum rubber stock 92 a substantially semicircular curvature when the cell is in the collapsed or flattened condition as viewed, for example, in Fig. 22.

After the gum rubber stock is in position about the form F, a first layer of cord reinforced rubber sheet material 88 is drawn from the supply roll R and is wrapped about the form with its edges joined together in a lap indicated at 97 in Fig. 21. Second, third and fourth ply material layers 102, 103 and 104 are then drawn onto the form F in superposed relation to the layer 101, the third layer being drawn onto the form by rotating the form the same direction as during application of the first layer and the second layer being applied like the fourth layer to provide a construction in which the cords are reversed or alternate in direction in successive layers. Lap joints or seams 105, 106 and 107 are formed in the second, third and fourth plies, respectively, which are similar to the lap joint 97 formed in the first layer 101.

At the ends of the form F the sheet material layers 101, 102, 103 and 104 are each trimmed to the substantially parallel line continuously curved contours shown in side elevation in Fig. 14, the sheet material layers on the opposite side of the form being trimmed to the same contours as shown for the near side. The second sheet material layer 102 has a curved edge 112 which overlaps and extends axially of the form beyond curved edge 111 of the first sheet material layer 101 and is in turn overlapped by curved edge 113 of the third layer 103. The fourth sheet material layer 104 has a curved edge 114 which extends axially beyond and overlaps the curved end edges of all of the underlying sheet material layers. In the staggered end edge construction thus provided the curved end edge of each sheet material layer except the outermost layer is embraced by a cord layer and held thereby against the layer of rubber lining material 92. The continuous parallel curves of the end edges 111—114 avoid stress concentration in the end closure structure of the cell and obtain a joint of smooth contour substantially free of objectional bulkiness and stiffness. Each of the curved end edges is in the form of a double ogee curve since the direction of curvature is changed at each side of the cell where the edge sweeps about apices 116 at the ends of the U-shaped side reliefs cut into the rubber liner material 92.

A cover layer 115 of raw or partly cured rubber compounded for toughness and wear resistant characteristics is applied to the outermost layer 104 of the cord reinforced sheet material layers after the latter have been wrapped about the mandrel F and either before or after the ends of the sheet material layers have been trimmed to the parallel curve contours described. The cover sheet 115 is discontinuous at and across the ends of the cell blanks, terminating short of the cell ends substantially along the end line indicated at 117, Fig. 14, to leave the cord material layers exposed for direct contact with the cord reinforced strips employed in making the end closures. The cover layer 115 is also discontinuous across the bottom of the lower mandrel half 81, terminating substantially along parallel longitudinally extending edges or lines 127 to permit direct contact between the outer cord material layers 104 of the cells C' and C'' when the cells are assembled together. As will later appear, a reinforcing strip 144 is inserted in the joint between the cells, this strip being U-shaped in section and having parallel edges that abut the cover strip edges 127 of the two cells. The cover strip 115 may also be discontinuous across that portion of the cell on the top of the upper form half 80 for direct contact of the outer layer 104 of the cord reinforced sheet material of the cell against the channel pan of the cushion assembly, or, as shown, the cover sheet may be continuous across the top of the form F from one side to another of the cell blank to provide a layer of cushion rubber between each cell and its corresponding channel pan.

While the open ended cylindrical cell blank is supported by the tubular mandrel F a number of apertures are cut or formed in the cell blank walls. These apertures are located by openings provided for the purpose in the halves 80 and 81 of the form or mandrel F. Since the same mandrel or form is or may be used in building both cells of the cushion assembly, the form is provided with different sets of these aperture locating openings. In building the cell blank for the cell C', an opening 108 centrally located in the form half 80 and axially spaced openings 109 in the form half 81 locate an aperture 98 on the top centerline and apertures 99 on the bottom centerline of a cell blank, the aperture 98 being provided to receive and locate the air stem 22 and the apertures 99 being those which are registered with corresponding apertures in the cell C'' to constitute the intercommunicating air passages 23. The upper mandrel half 80 is also formed with holes or openings 110 spaced axially along the length of the cell blank for locating cell blank apertures 100 that receive and locate the internally threaded stems 24 in assembly. The holes or openings 109 in the lower form half 81 are used in locating the intercommunicating apertures 99 in the cell blank for the bottom cell C' that are aligned with the correspondingly formed apertures in the cell blank for the upper cell C' to constitute the cell connecting air passages 23.

Upon completion of curved or contoured end edges on the sheet material layers and the formation of the openings for the cell connecting passages and the inflation stem 22, (for the threaded stems 24 in the case of the blank for cell C'') the operations on the cylindrical form or mandrel F are completed and the cell blank, now in the form of a substantially cylindrical open ended tube, is removed from the forming mandrel F for further processing.

As a preferred arrangement the cell blank is moved directly from the collapsed halves of the forming mandrel F axially over and onto, in telescoping relation, supplemental cantilever support or mandrel 118. The supplemental mandrel 118 may comprise a long metal member or plate having a width less than the diameter of the cylindrical cell blank. A stiffening rib 119, tapered along its length, is welded or otherwise secured to the bottom of the plate. The plate mandrel 118 and the stiffening rib 119 are welded or otherwise secured at one end to a plate 120 suitably supported as on a post or pedestal structure 121 so that the supplemental mandrel extends horizontally from the support in cantilever fashion, permitting the cell blank to be drawn axially thereon over the free end 122 of the mandrel.

At intervals along the length of the supplemental mandrel, corresponding to the spacing between the cushion blocks 75 and 76, the plate 118 is apertured to provide sockets 123 into which the loose rubber blocks are fitted before the cell blank is drawn onto the supplemental mandrel. Cups 124 disposed beneath the sockets 123, being supported in cutouts or notches in the reinforcing rib 119, give full support to the rubber blocks to prevent objectionable deformation of the latter when subjected to assembly pressure.

The supplemental mandrel 118 is also formed on its upper face with recesses or sockets for the stems 22 and 24. In Fig. 15 the socket for the air inflating stem 22, employed in assembling the cell C', is indicated at 125 and the socket for one of the threaded stems 24, employed in assembling the cell C'', is indicated at 126. The socket 125 is contoured to fit rubber base flap 128 (Fig. 19) of the air inflating stem 22, such base flap being of tapered or generally frusto-conical shape.

The open ended cell blank shown in Fig. 15 becomes the cell C', the upper of the two cells shown in cushion assembly A. The lower cell C'' of the cushion assembly is made in a similar way from a similar open ended cell blank except that in lieu of the air inflating stem 22 the internally threaded stems 24 are supported in sockets in the upper surface of the supplemental mandrel 118 to locate the stems 24 in predetermined axial relation to the blocks 75 and 76 and in alignment with such blocks. The threaded stems 24 have circular rubber base flaps 129 similar to the base flap 128 of the air inflating stem 22 and the mandrel sockets for the flaps 129 are suitably contoured to receive the latter. By employing the same set of sockets 123 for locating the cushion blocks 75 and 76 of the bottom cell C'' as are used to locate the blocks of the upper cell C' of the cushion it is assured that the blocks of the two cushions are aligned with one another and are disposed in bearing relation in the completed cushion assembly.

To retain the stems 22 and 24 in position in the sockets or recesses 125 and 126 during the movement thereover of the tubular cell blank, upstanding pins, not shown, are located in the sockets, the pins being secured to the mandrel and disposed to project axially into the stems 22 and 24. To withdraw the stems after assembly with the cell blanks the stems are either lifted off the locating pins or the latter are withdrawn from the axial openings in the stems by well-known mechanisms.

After the spacing cushions 75 and 76 and the base of the stem 22 (or the stems 24, as the case may be) have been located and pressure bonded to the inside surface of the cell blank wall the latter is withdrawn axially from the cantilever supplemental mandrel 118, the spacing blocks and stem bases being raised out and freed from the locating sockets prior to the withdrawal.

When the two tubular cell blanks that are to constitute the cells C' and C'' of a cushion assembly have progressed to this stage of completion they can be completed individually as separated cells by forming the end closures thereon and then assembled together, or (and this is the preferred procedure since it permits partial inflation of the cells without plugging the apertures 99, as will later appear) the two cell blanks are pressed against one another in parallel relation with their reinforced openings 99 in registry to define the intercell passages 23. This juxtaposition of the cell wall openings for one of the passages 23 is shown diagrammatically in Fig. 18, which illustrates the manner in which the two ring-like reinforced gum stock bindings 131 surrounding the aligned tube apertures come together at the common passage and are thus in position and condition to flow together in the formation of an integral one piece homogeneous gum rubber liner for the passage 23 during the subsequent curing process. The surfaces of the two tubular cell blanks around the apertures 99 are treated with rubber cement or the like and pressed together to hold the cell blanks in assembled relation during subsequent handling and end closure construction.

End closures

After withdrawal of the tubular cell blank from the supplemental mandrel 118 and either before but preferably after the two cell blanks that are to comprise a cushion assembly have been placed together, the ends of the cell or cells are closed. The closure is made with the cell or cells supported in a flattened condition on a suitable table or bench, the plan form of a flattened cell being shown diagrammatically in Fig. 22. The curved end edges of the cord reinforced sheet material layers are in staggered or offset relation, the outer layers projecting axially of the cell blank about ¼" to about ½" beyond the next adjacent underlying layer and the overlap being substantially uniform about the entire periphery of each cord material layer. The sealing gum stock layer 92 on the inside of the cell wall projects axially about one inch beyond the outer or longest of the cord reinforced sheet material layers permitting margins of this projecting gum stock to be pinched together in the provision of a primary seal for the cell blank end. The bonding together of the gum stock edge margins may be improved by the use of rubber cement or other adhesion agent and care is taken in applying the soapstone previously mentioned to protect the end edges of the gum stock liner. A binding strip 133 of gum rubber stock, as shown in section in Fig. 24, is manipulated to U shape and wrapped about the pinched together end edges of the gum stock liner 92. The edges of the gum stock strip 133 extend axially along the sides of the cell blank beyond the apices 116 so as to effectuate a complete seal about the entire length of the semi-circular joint between the end edges of the gum stock liner 92. A series of reinforcing strips are then wrapped about the semi-circular end of the cell blank, these strips being of rectangular shape and comprising cord reinforced rubber sheet material in which the cords are disposed at about 15 degrees to the transverse axis of the strip (or about 75 degrees to the longitudinal axis of the strip). The first strip, indicated at 135, is applied over the gum stock sealing strip 133 and is the narrowest and shortest of the cord reinforced fabric binding strips. It extends in overlapping relation to the edges of the outermost layer 104 of the sheet material comprising the body of the cell. The second fabric binding strip, indicated at 136 and wider and longer than the first binding strip, extends beyond the edges and ends of the latter and overlaps both the outermost layer and the second outer layer 103 of the body sheet material. In a similar manner the third and fourth fabric binding strips indicated at 137 and 138 respectively are wrapped about the semicircular cell blank end, each successive strip being wider and longer than the preceding so that the fourth or outermost strip 138 extends beyond all of the staggered end edges of the sheet material layers of the cell body and thus overlies all of the body sheet material layers. A cover layer 139 of tough wear resistant rubber composition is placed over the superposed layers 135–138 of the end closure, this cover sheet being of the same composition as the cover sheet 115 on the sides of the cell and abutting the end edge 117 of the side cover sheet as shown in Fig. 29.

In addition to the overlapping arrangement of the side marginal edges of the binding strips 135–138 these strips are overlapped or staggered at their end edges 140 to provide at the sides of the cells over the apices 116 of the semicircular ends tapered joints between the several layers of cord reinforced sheet material comprising the body of the cell and the several binding strip layers that embrace the semicircular seal at each end of the cell. The binding strips 135–138 and the underlying gum rubber strip 133 constitute an end closure for the cell which, as appears in Figs. 38 and 39 showing the cushion after molding, is tapered in thickness along both the top and bottom semicircular marginal edges and also along both side edges which overlap the cell and apices 116 and extend axially along the cell sides.

Upon completion of the end closures and the securing together of the cells C' and C" with the apertures 99 in registry the cell pair is placed between the upper and lower channel pans 18 and 19, the cushions being located relative to the pans by the interfitting relation of the stems 22 and 24 in the openings 37 and 25 for these stems previously formed in the pans in predetermined locations. The cell-engaging surface of each of the pans 18 and 19 is treated with a suitable metal-to-rubber bonding agent over an area of predetermined extent, this area constituting the tapered bonding zone 17, to be later described.

In the bight or apex angle where the cells C' and C" come together a filler strip 141 is inserted to provide a tear resistant cove joint between the cushions. Filler strips 142 and 143 are inserted in the joints between the upper and lower cells and their respective attaching pans. Each of the filler strips is wedge shape in cross-section and is annular in extent or continuous about the entire periphery of the bonding zone defined by such strip between the cells or between one of the cells and one of the channel pans. In the bight or angle between the two inflatable cells a reinforcing strip 144 of cross woven rubberized fabric is inserted, this fabric strip being bent or folded to U shape in cross-section so as to bridge the joint across the filler strip 141 thereby connecting the outer surfaces of the walls of the two cells along the margins of the bonding zone. As previously mentioned, the wear resistant rubber covering 115 is preferably discontinuous across the bonding zone between the two cells, preferably terminating adjacent or in abutting relation to the edges of the cross woven fabric binding strip. The placement of the filler strips 141–143 and the fabric connecting strip 144 is facilitated by the use of suitably contoured jigs which hold and locate these strips in desired positions relative to the pneumatic cells and the channel pans while internal pressure and localized external pressure is applied to bond the parts together sufficiently for manipulation and handling in placing the assembled cushion in a mold for curing. The usual bonding agents or cements are utilized on the filler and connecting strips and on the cushion and channel surfaces to which these parts are to be attached to hold the several parts together when bonded by pressure.

*Method of molding and molding apparatus*

The cells and channel pans of the cushion assembly when assembled together in desired relative positions and held by bonding agents comprise an unwieldy structure that is difficult to handle and which is subject to damage as by dislocation or separation of parts. To facilitate the handling of the uncured cushion assembly it is enclosed in a confining, preferably open sided, frame and inflated as by air to a pressure sufficient to hold the parts in assembled relation and to prevent separation of the seams and joints. The confining frame comprises a pair of metal bars 146 and 147 which are disposed in spaced generally parallel relation, the bar 146 being received between the flanges 29 of the channel pan 18 and the bar 147 being received between the flanges of the channel pan 19. The bars or rails 146 and 147 have confronting surfaces that are received flatwise against the outer faces of the channel pans to reinforce the relatively thin channel pans against deformation or damage as by warping under the high internal pressures used during the molding operation. The bars or rails 146 and 147 thus constitute supplemental molding members, as will appear, and are formed with reliefs or rabbets 148 along their opposite side edges to receive the flanges 29 of the channel pans.

At their ends the mold members or rails 146 and 147 are formed with axial sockets 150 which receive spaced parallel pins 151 secured to and projecting outwardly from connecting members or jigs 152. These jigs each extend between the supplemental mold members and are located at the opposite ends of the latter. They thus constitute end connectors which hold the supplemental frame members 146 and 147 in predetermined parallel relation. An enclosing frame is thus provided for holding the cushion assembly while the latter is placed between the mold halves. The supplemental mold members 146 and 147 extend slightly beyond the ends of the channel pans 18 and 19 of the cushion assembly (see Fig. 34) so that the connecting members or frame elements 152 are located wholly beyond the ends of the cushion assembly, leaving the sides of the latter clear and unobstructed for placement between mold sections for curing.

A suitable curing mold comprises sections 153 and 154 in combination with the bar members 146 and 147. These main mold members or sections have confronting faces suitably contoured to define a cavity of the desired two-cell cushion shape. Each main mold section extends the full length of the cushion assembly and beyond the ends thereof as shown in Figs. 34 and 35. Approximately half of the mold cavity is formed in each of the mold halves, the two halves being piloted together and held in registry by suitable pins 156 and sockets 157, the pins being carried by the mold section 154 and extending through the parting plane indicated by line 158, and into the recesses in the mold section 153. The stems 22 and 24, received in apertures 159 in the supplemental mold members or frame rails 146 and 147 are utilized for inflating the cushion assembly during curing and for circulating steam through the interiors of the cells during the curing cycle. A gas such as carbon dioxide is supplied under pressure to the cushion while the latter is confined in the mold by connection of a suitable conduit 160 from a suitable source to the stem 22, the usual check and control valves being inserted in the line. Steam under pressure is supplied to the cushion as required by the curing system employed through conduits 161 connected to the stems 24, one such conduit being a steam supply conduit and the other being a return steam conduit.

To place the cushion assembly in the mold, the assembly, confined by the four-part enclosing cage or frame comprising the end connectors or jigs 152 and the supplemental mold members 146 and 147 and expanded by the internal pressure within the cells C' and C'', is lifted as a unit by a suitable hoist or crane for placement between the main mold sections, connection being made through a suitable sling provided with hooks that engage integral loops or rings 170 extending axially from the connecting elements 152 of the confining four-piece frame. The balance or equilibrium of the assembly is such that when suspended from a sling in the manner described the cushion and the confining frame are disposed substantially in the position shown in Fig. 32, the supplemental mold members 146 and 147 being at approximately the same horizontal level. The hoist or crane from which the cushion assembly is thus sustained may be then manipulated to locate the assembly over the mold section 154 indicated in broken lines in Fig. 32 and which is supported on a horizontal surface with its cavity-defining wall facing upwardly so as to receive one side of the cushion assembly as the latter is lowered into position. The other mold section or half 153, indicated by broken lines in Fig. 32, is then placed on the cushion assembly in matching relation to the previously placed mold section 154. The mold sections are conveniently carried and manipulated by conventional slings that are connected to knobs 162 which project over opposite sides of the mold halves or sections.

The cavity-defining faces of the main mold halves or sections 153 and 154 are each formed with a longitudinally extending central rib 163 and marginal ribs 164 which parallel the central rib. These ribs define the bonding zones or areas between the cells C' and C'' and between the cells and the channel pans 18 and 19. The ribs are accordingly tapered in plan form as shown in Figs. 35 and 36 to provide the desired tapering of the attachment areas or bonding zones. The taper of the ribs 163 which define the bonding zone between the cushion cells differs from the taper of the ribs 164 which define the bonding zones between the cells and the channel pans so that the bonding area or zone 17 between the cells is of less extent than the bonding area or zone 20 between each of the cells and the channel pan to which it is connected, the zone 17 being generally narrower and somewhat shorter than the zones 20.

The side edges of the rail or supplemental mold members 146 and 147 are received in parallel recesses 165 formed in the confronting faces of the main mold sections 153 and 154. These recesses are tapered in depth, one side of each recess being defined by one of the longitudinally extending mold ribs 164 which establishes the limits of the bonding zone between one of the cushion cells and the channel pan to which such cushion cell is attached and the other side of each recess being inclined at an acute angle to the plane of relative movement of the mold members in closing about the cushion structure. The supplemental mold members 146 and 147 are formed with inclined faces 166 which match the inclined walls of the recesses 165 in the main mold members so that in the completely assembled mold the side walls of the recesses 165 meet the inclined faces 166 of the supplemental mold members along parting lines 167, which are at an acute angle to the plane of relative closing movement of the main mold members.

Suitable mold embracing clamps, not shown, are locked in embracing relation about the sections 153 and 154 to hold the mold together when subjected to the high internal pressures used in the curing process, or connecting links can be used between the knobs 162 of the two mold sections.

With the assembled cushion structure confined in the molding cavity by the matched mold halves 153 and 154 and by the parallel rail members 146 and 147 which are received in the recesses 165 of the mold pans and serve as spacers for the latter, the rubber is cured by placing the entire mold assembly and the enclosed cushion structure in an open steam autoclave or curing chamber.

The structure and arrangement of the multiple layer walls of the cells and of the end closures are substantially as shown in Figs. 38 and 39 when removed from the mold in cured condition. High internal pressures coupled with the softening of the rubber under the influence of the heat forces the end closures to the semicircular sectional shape shown in Fig. 38, which is substantially the section shown in uncured condition in Fig. 28.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What we claim and desire to secure by Letters Patent is:

1. A cushion structure for a pneumatic suspension system, said cushion comprising two elongated flexible superposed cells, the abutting walls of adjacent cells being permanently bonded together in the provision of a common partition between such cells, a plurality of bumper blocks in each cell attached to the top wall of the top cell and the bottom wall of the bottom cell, the several blocks in each cell being aligned with corresponding blocks in the other cell to provide mutual support upon collapse of the cells and to grip the partition wall of the cells to resist relative lateral movement of such partition in the collapsed condition of the cushion.

2. A cushion structure for a pneumatic suspension system, said cushion comprising a plurality of elongated flexible superposed cells, the walls of adjacent cells being permanently bonded together in the provision of a common partition between such cells, a plurality of bumper blocks in each cell, the blocks being spaced along the length of each of the cells and corresponding blocks in the different cells being substantially aligned for mutual support.

3. In a pneumatic cushion system having spaced elongated metal members adapted for relative hinging movements about a substantially horizontal central axis, and an elongated deformable pneumatic cell interposed between the metal members, the cell having flexible walls of rubber or the like, the improvement which comprises a plurality of blocks inside and spaced along the length of the cell, said blocks being arranged to support a load imposed on the system upon collapse of the cell, and the blocks being of different thicknesses with the thicker block located relatively close to the hinge axis and the less thick blocks being located relatively remote from the hinge axis.

4. In a pneumatic cushion system having spaced elongated metal memebrs adapted for relative hinging movements about a substantially horizontal central axis, and an elongated deformable pneumatic cell interposed between the metal members, the cell having flexible walls of rubber or the like, the improvement which comprises bumper means within the cell between the top and bottom walls of the latter to prevent said walls coming together under load, said bumper means being distributed along the length of the cell and being relatively of greater height adjacent the hinge axis than remote from said axis.

5. In a pneumatic cushion comprising an elongated tubular cell having walls of layers of bias cord reinforced rubber sheet material, an improved end closure construction comprising a plurality of layers of bias cord reinforced rubber sheet material overlapping the sheet material layers of the cell walls, the edges of the cell sheet material layers being staggered, the longest sheet material layer of the cell being on the outside of the cell, and the sheet material layers of the end closure also being staggered, the shortest layer of the end closure being positioned to overlap the majority of the layers of the cell walls.

6. In a pneumatic cushion, a cell structure comprising a plurality of layers of cord reinforced rubber sheet material, the sheet material being arranged to form a tube of substantially uniform section, the individual sheet material layers at one end of the tube having edge contours comprising substantially continuous curves, and the curved edges of adjacent layers being offset with respect to one another, a closure for said end of the tube, said closure comprising layers of sheet material disposed one upon another in superposed relation and having staggered edges all of which overlap the majority of the edges of the sheet material of the tube at said one end of the tube.

7. A pneumatic cushion comprising a pair of similar tubular cells of substantially uniform width from end to end and substantially flat cross-section disposed flatwise against one another and having integral connection between their contacting faces over a tapered bonding zone which decreases in width toward opposite ends of the cushion.

8. A pneumatic cushion comprising a pair of similar tubular cells of substantially flat cross-section disposed flatwise against one another and having integral connection with one another over a tapered bonding zone, said bonding zone terminating short of the ends of the cells and being discontinuous across said cell ends to permit relative movement of the cell walls toward and away from one another in longitudinal rocking of the cushion, and the bond connection having a wide portion intermediate the ends of the cells to resist lateral rolling of the cells.

9. A pneumatic cushion comprising elongated cells of substantially uniform section tubes having walls of cord reinforced rubber material disposed against one another in generally parallel relation, and means securing together the contacting walls of the cells over zones which taper longitudinally of the cushion to permit relatively greater expansion of the cells at the narrow portions of said zones than at the wide portions thereof to facilitate longitudinal rocking of said cushion, said wide portions having a greater resistance to lateral rolling of the cushion cells than said narrow portions.

10. In pneumatic cushion structure, a plurality of similar cells disposed one against another, each cell comprising an elongated tube of substantially uniform flattened cross-section, the cells being disposed with their flat sides against one another, and the contacting sides of the cells being bonded together along the length of the cushion, the bond including a relatively wide central portion and relatively narrow portions spaced on opposite sides of the wide central portion adjacent the ends of the cushion, the bond being tapered in width along the length of the cushion between the wide and narrow portions.

11. In a pneumatic cushion system having spaced elongated metal members adapted for relative hinging movements about a substantially horizontal central axis, and an elongated deformable pneumatic cell interposed between the metal members, the cell having flexible walls of rubber or the like, the improvement which comprises a substantially continuous bond between the cell walls and at least one of the metal members over a zone which tapers along the length of the metal members with the wide portion of the bond zone adjacent the hinge axis and the narrow portion of the bond remote from the hinge axis.

12. In a pneumatic cushion structure, a pair of elongated metal members, a plurality of deformable air cells interposed between the metal members to space the latter, said air cells being bonded to one another and to the metal members to secure the cells and the metal members together as a unit, and at least one of the bonds between the cells and the metal members being tapered longitudinally of the cushion to stabilize the cells against lateral displacement while permitting flexing of the air cells for longitudinal rocking of the cushion structure.

13. In a pneumatic cushion structure, a pair of elongated metal members, a plurality of deformable air cells interposed between the metal members to space the latter, said air cells being bonded to one another and to the metal members to secure the cells and the metal members together as a unit, said metal members comprising sheet metal pans of substantially channel section providing substantially flat surfaces for contact with the deformable cells, and the bonds between the cells and the sheet metal pan members being substantially continuous over tapered zones on the flat surfaces of the pan members.

14. In a pneumatic cushion structure, a pair of elongated metal members, a plurality of deformable air cells interposed between the metal members to space the latter, said air cells being bonded to one another and to the metal members to secure the cells and the metal members together as a unit, said metal members comprising sheet metal pans of substantially channel section providing substantially flat surfaces for contact with the deformable cells, and all of the bonds being tapered longitudinally of the cushion to permit flexing of the air cells in longitudinal rocking of the cushion while resisting lateral rolling of the air cells relative to the sheet metal pan members.

15. In a load supporting pneumatic cushion structure having an inflatable flexible walled air cell with an internal chamber therein and a conduit for supplying air to the cell, the improvement which comprises an outlet passage connected to the cell to release air from the latter, valve means responsive to distention of the air cell beyond a predetermined limit for controlling the said release of air when the load on the structure is reduced, and a plurality of blocks inside and spaced along the length of the cell, said blocks being arranged to support the load imposed on the structure upon collapse of the cell.

16. In a pneumatic cushion structure, a pair of elongated metal members having substantially flat surfaces, a pair of deformable air cells interposed between the metal members to space the latter, said air cells having flat sides engaging one another and engaging said flat surfaces, the contacting sides being bonded together along the length of the cushion to form a tapered bonding zone which decreases in width toward opposite ends of the cells, said air cells being bonded to said metal members along tapered bonding zones similar to but slightly larger than said first-mentioned zone.

References Cited in the file of this patent

UNITED STATES PATENTS

| | | |
|---|---|---|
| 673,011 | Annable | Apr. 30, 1901 |
| 684,050 | Falconnet | Oct. 8, 1901 |
| 709,021 | Lefferts | Sept. 16, 1902 |
| 901,007 | Hopkinson | Oct. 13, 1908 |
| 1,442,518 | Bowers | Jan. 16, 1923 |
| 1,445,486 | Cats | Feb. 13, 1923 |
| 1,732,793 | Darrow | Oct. 22, 1929 |

(Other references on following page)

UNITED STATES PATENTS

| | | |
|---|---|---|
| 1,915,303 | Forsyth | June 27, 1933 |
| 1,951,974 | Goodwinn | Mar. 20, 1934 |
| 1,991,184 | Towner | Feb. 12, 1935 |
| 2,062,574 | Heinze | Dec. 1, 1936 |
| 2,192,355 | Kuhn | Mar. 5, 1940 |
| 2,488,288 | Gouirand | Nov. 15, 1949 |
| 2,573,609 | Robinson | Oct. 30, 1951 |
| 2,597,550 | Tritt | May 20, 1952 |

FOREIGN PATENTS

| | | |
|---|---|---|
| 239,426 | Great Britain | Sept. 17, 1925 |
| 701,904 | France | Jan. 13, 1931 |